United States Patent
Riehle

(10) Patent No.: US 6,429,267 B1
(45) Date of Patent: Aug. 6, 2002

(54) PROCESS TO REDUCE THE AOX LEVEL OF WET STRENGTH RESINS BY TREATMENT WITH BASE

(75) Inventor: Richard James Riehle, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/224,107

(22) Filed: Dec. 22, 1998

Related U.S. Application Data

(63) Continuation-in-part of application No. 09/001,787, filed on Dec. 31, 1997, now abandoned.

(51) Int. Cl.[7] ............................................. C08L 77/00
(52) U.S. Cl. ................. 525/430; 162/164.1; 162/164.6; 528/489
(58) Field of Search ................. 162/72, 164.1, 162/164.6, 166; 528/488, 489; 524/608; 525/430

(56) References Cited

U.S. PATENT DOCUMENTS

| | | | |
|---|---|---|---|
| 2,595,935 A | 5/1952 | Daniel et al. | |
| 2,595,936 A | * 5/1952 | Daniel et al. | 92/3 |
| 2,926,116 A | 2/1960 | Keim | 162/164 |
| 2,926,154 A | 2/1960 | Keim | 260/29.2 |
| 3,248,353 A | 4/1966 | Coscia | 260/29.2 |
| 3,311,594 A | * 3/1967 | Earle | 260/77.5 |
| 3,332,901 A | 7/1967 | Keim | 260/29.2 |
| 3,352,833 A | * 11/1967 | Earle | 260/78 |
| 3,655,506 A | * 4/1972 | Baggett | 162/164 |
| 3,700,623 A | 10/1972 | Keim | 260/80.3 |
| 4,388,439 A | 6/1983 | Masianka | |
| 4,487,884 A | 12/1984 | Maslanka | 524/845 |
| 4,857,586 A | 8/1989 | Bachem et al. | 524/845 |
| 4,929,309 A | 5/1990 | Bachem et al. | 162/164 |
| 4,975,499 A | * 12/1990 | Bechem et al. | 525/430 |
| 5,019,606 A | 5/1991 | Marten et al. | 523/414 |
| 5,171,795 A | 12/1992 | Miller et al. | 525/430 |
| 5,189,142 A | 2/1993 | Devore et al. | |
| 5,239,047 A | 8/1993 | Devore et al. | |
| 5,256,727 A | 10/1993 | Dulany | 524/608 |
| 5,344,620 A | * 9/1994 | Reiners et al. | 427/288 |
| 5,364,927 A | 11/1994 | Devore et al. | |
| 5,470,742 A | * 11/1995 | Bull et al. | 435/262 |
| 5,516,775 A | * 5/1996 | Gorzynski et al. | 528/482 |
| H1613 H | * 11/1996 | Espy | 528/489 |
| 5,575,892 A | 11/1996 | Devore et al. | |
| 5,843,763 A | 12/1998 | Bull et al. | |
| 5,871,616 A | 2/1999 | Bull et al. | |
| 5,972,691 A | 10/1999 | Bates et al. | |

FOREIGN PATENT DOCUMENTS

| | | | |
|---|---|---|---|
| EP | 349935 | 1/1990 | ............ D21H/2/20 |
| EP | 374 938 A1 | 6/1990 | |
| EP | 469 891 A1 | 2/1992 | |
| EP | 508 203 A1 | 10/1992 | |
| EP | 510987 | * 10/1992 | |
| EP | 512423 | * 11/1992 | |
| EP | 542236 | * 5/1993 | |
| EP | 776 923 A2 | 6/1997 | |
| WO | 92 22601 | * 12/1992 | |
| WO | 93 21384 | * 10/1993 | |
| WO | 96/40967 | 6/1996 | |

OTHER PUBLICATIONS

International Search Report for PCT counterpart application No. PCT/US98/27538.

* cited by examiner

*Primary Examiner*—Christopher A. Fiorilla
(74) *Attorney, Agent, or Firm*—Dennis G. Morrell

(57) ABSTRACT

Process for reducing the AOX content of wet-strength resins, such as polyaminopolyamide-epi or polyalkylene polyamine-epi resins, by treatment with base, e.g. sodium hydroxide, while maintaining the wet-strength effectiveness of the resin.

52 Claims, No Drawings

PROCESS TO REDUCE THE AOX LEVEL OF WET STRENGTH RESINS BY TREATMENT WITH BASE

This application is a continuation-in-part of 09/001,787, filed Dec. 31, 1997, now abandoned.

BACKGROUND OF THE INVENTION

1. Field of the Invention

The present invention relates to the process of reducing the absorbable organic halogen (AOX) level in wet-strength resins while maintaining or improving their wet-strength effectiveness and more particularly it relates to treating such resins with base.

2. Description of the Prior Art

Commercial polyaminopolyamide-epichlorohydrin resins typically contain 1–10% (dry basis) of the epichlorohydrin (epi) by-products, 1,3-dichloropropanol (1,3-DCP), 2,3-dichloropropanol (2,3-DCP) and 3-chloropropanediol (3-CPD). Production of wet-strength resins with reduced levels of epi by-products has been the subject of much investigation. Environmental pressures to produce wet-strength resins with lower levels of absorbable organic halogen (AOX) species have been increasing. "AOX" refers to the absorbable organic halogen content of the wet strength resin which can be determined by means of adsorption unto carbon. Accordingly, AOX includes epichlorohydrin (epi) and epi by-products (1,3-dichloropropanol, 2,3-dichloropropanol and 3-chloropropanediol) as well as organic halogen bound to the polymer backbone.

Azetidinium-containing, polyaminopolyamide-epi resins have been treated with a basic ion exchange column to give a low AOX and low total chloride resin (WO/92/22601, assigned to Akzo NV). After this treatment, the resin was acidified. A disadvantage of this process is the ion exchange column has limited capacity and needs to be regenerated once the basicity is consumed. An additional disadvantage is the resin has reduced effectiveness when treated with the basic ion exchange column.

Other technologies remove epi by-products but do not remove polymer-bound AOX (i.e., polymeric aminochlorohydrin). Polyaminopolyamide-epi resins have been treated with microorganisms to reduce epi by-products to less than 10 ppm (EP 510987, assigned to Hercules Incorporated). This treatment, however, does not remove organic halogen bound to the polymer backbone. Another process to remove epi by-products uses a column of carbon adsorbent (WO 93/21384, assigned to E. I. duPont de Nemours). Such columns have limited capacity and to need to be regenerated once the adsorbent no longer efficiently removes the epi by-products.

SUMMARY OF THE INVENTION

According to the present invention there is provided a process for reducing the AOX content of a starting water-soluble wet-strength resin comprising azetidinium ions and tertiary aminohalohydrin, comprising treating said resin in aqueous solution with base to form treated resin, wherein at least about 20% of the tertiary aminohalohydrin present in the starting resin is converted into epoxide and the level of azetidinium ion is substantially unchanged, and the effectiveness of the treated resin in imparting wet strength is at least about as great as that of said starting wet-strength resin.

Further provided is the water-soluble wet-strength resin prepared by the process of the present invention.

Still further provided is the process for preparing paper using the wet-strength resin prepared by the present invention and the paper so made.

DETAILED DESCRIPTION OF INVENTION

It surprisingly has been discovered that the AOX content of azetidinium and aminochlorohydrin containing wet strength resins can be greatly reduced while maintaining or even improving their wet strength characteristics. The starting water-soluble wet-strength resins of the present invention can be polyaminopolyamide-epi resins or polyalkylene polyamine-epi resins and mixtures thereof.

The conversion of the tertiary aminochlorohydrin (ACH) of the wet-strength resins of the present invention to tertiary epoxide by base treatment can be illustrated by the following formula:

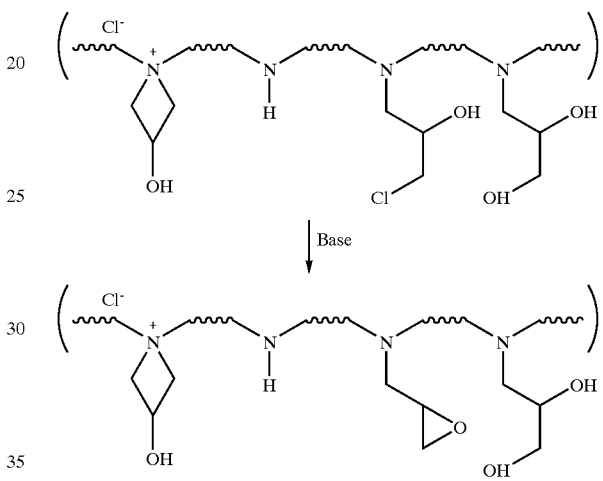

Polyaminopolyamide-epichlorohydrin resins comprise the water-soluble polymeric reaction product of epichlorohydrin and polyamide derived from polyalkylene polyamine and saturated aliphatic dibasic carboxylic acid containing from about 3 to about 10 carbon atoms. It has been found that resins of this type impart wet-strength to paper whether made under acidic, alkaline or neutral conditions. Moreover, such resins are substantive to cellulosic fibers so that they may be economically applied thereto while the fibers are in dilute aqueous suspensions of the consistency used in paper mills.

In the preparation of the cationic resins contemplated for use herein, the dibasic carboxylic acid is first reacted with the polyalkylene polyamine, under conditions such as to produce a water-soluble polyamide containing the recurring groups —NH(C$_n$H$_{2n}$NH)$_x$—CORCO— where n and x are each 2 or more and R is the divalent hydrocarbon radical of the dibasic carboxylic acid. This water soluble polyamide is then reacted with epi to form the water-soluble cationic thermosetting resins.

The dicarboxylic acids contemplated for use in preparing the resins of the invention are the saturated aliphatic dibasic carboxylic acids containing from 3 to 10 carbon atoms such as succinic, glutaric, adipic, azelaic and the like. The saturated dibasic acids having from 4 to 8 carbon atoms in the molecule, such as adipic and glutaric acids are preferred. Blends of two or more of the saturated dibasic carboxylic acids may also be used.

A variety of polyalkylene polyamines including polyethylene polyamines, polypropylene polyamines, polybutylene polyamines, polypentylene polyamines, polyhexylene polyamines and so on and their mixtures may be employed of which the polyethylene polyamines represent an economically preferred class. More specifically, the polyalkylene polyamines contemplated for use may be represented as polyamines in which the nitrogen atoms are linked together by groups of the formula —$C_n H_{2n}$—where n is a small integer greater than unity and the number of such groups in the molecule ranges from two up to about eight. The nitrogen atoms may be attached to adjacent carbon atoms in the group —$C_n H_{2n}$—or to carbon atoms further apart, but not to the same carbon atom. This invention contemplates not only the use of such polyamines as diethylenetriamine, triethylenetetramine, tetraethylenepentamine, and dipropylenetriamine, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a satisfactory starting material. The term "polyalkylene polyamine" employed in the claims, therefore, refers to and includes any of the polyalkylene polyamines referred to above or to a mixture of such polyalkylene polyamines and derivatives thereof.

It is desirable, in some cases, to increase the spacing of secondary amino groups on the polyamide molecule in order to change the reactivity of the polyamide-epichlorohydrin complex. This can be accomplished by substituting a diamine such as ethylenediamine, propylenediamine, hexamethylenediamine and the like for a portion of the polyalkylene polyamine. For this purpose, up to about 80% of the polyalkylene polyamine may be replaced by molecularly equivalent amount of the diamine. Usually, a replacement of about 50% or less will serve the purpose.

In converting the polyamide, formed as above described, to a cationic thermosetting resin, it is reacted with epichlorohydrin at a temperature from about 25° C., to about 100° C. and preferably between about 35° C. to about 70° C. until the viscosity of a 20% solids solution at 25° C. has reached about C or higher on the Gardner Holdt scale. This reaction is preferably carried out in aqueous solution to moderate the reaction. Although not necessary, pH adjustment can be done to increase or decrease the rate of crosslinking.

When the desired viscosity is reached, sufficient water is then added to adjust the solids content of the resin solution to the desired amount, i.e., about 15% more or less, the product cooled to about 25° C. and then stabilized by adding sufficient acid to reduce the pH at least to about 6 and preferably to about 5. Any suitable acid such as hydrochloric, sulfuric, nitric, formic, phosphoric and acetic acid may be used to stabilize the product. However, hydrochloric acid and sulfuric acid are preferred.

In the polyamide-epichlorohydrin reaction, it is preferred to use sufficient epichlorohydrin to convert most of the secondary amine groups to tertiary amine groups. However, more or less may be added to moderate or increase reaction rates. In general, satisfactory results may be obtained utilizing from about 0.5 mole to about 1.8 moles of epichlorohydrin for each secondary amine group of the polyamide. It is preferred to utilize from about 0.6 mole to about 1.5 moles for each secondary amine group of the polyamide.

Epichlorohydrin is the preferred epihalohydrin for use in the present invention. The present application refers to epichlorohydrin specifically in certain instances, however, the person skilled in the art will recognize that these teachings apply to epihalohydrin in general.

Cationic water-soluble resins, derived from the reaction of epihalohydrins, such as epichlorohydrin, and polyalkylene polyamines, such as ethylenediamine (EDA), bis-hexamethylenetriamine (BHMT) and hexamethylenediamine (HMDA) have long been known. These polyalkylene polyamine-epihalohydrin resins are described in patents such as U.S. Pat. No. 3,655,506 to J. M. Baggett, et al. and others such as U.S. Pat. No. 3,248,353 and U.S. Pat. No. 2,595,935 to Daniel et al. from which their generic description as "Daniel's Resins" arises.

The polyalkylene polyamine employed in the present invention is selected from the group consisting of polyalkylene polyamines of the formula:

where:
n=1–7,
x=1–6
R=H or $CH_2Y$,
Z=H or $CH_3$, and
Y=$CH_2Z$, H, $NH_2$, or $CH_3$,
polyalkylene polyamines of the formula:

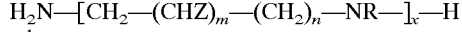

where:
m=1–6, n=1–6, and m+n=2–7,
R=H or $CH_2Y$,
Z=H or $CH_3$, and
Y=$CH_2Z$, H, $NH_2$, or $CH_3$, and mixtures thereof.

Polyalkylene polyamine-epihalohydrin resins comprise the water-soluble polymeric reaction product of epihalohydrin and polyalkylene polyamine. In making Daniel's Resins the polyalkylene polyamine is added to an aqueous mixture of the epihalohydrin so that during the addition the temperature of the mixture does not exceed 60° C. Lower temperatures lead to further improvements, though too low a temperature may build dangerously latent reactivity into the system. The preferred temperatures fall within the range of about 25° C. to about 60° C. More preferred is a range of from about 30° C. to about 450° C.

Alkylation of the polyamine occurs rapidly proceeding to form secondary and tertiary amines depending on the relative amounts of epihalohydrin and polyamine. The levels of epihalohydrin and polyamine are such that between about 50 and 100% of the available amine nitrogen sites are alkylated to tertiary amines. Preferred levels are between about 50 and about 80% alkylation of the amine nitrogen sites. Excess epihalohydrin beyond that required to fully alkylate all the amine sites to the tertiary amine is less preferred because this results in increased production of epihalohydrin byproducts.

To minimize epi byproducts and AOX, preferably time spent combining the polyamine and epichlorohydrin should be minimized. This is required to minimize the period during the combining of reactants, in which there is a significant level of unalkylated or partially alkylated polyamine in the presence of uncombined epichlorohydrin. This condition results in an alkaline system in which conversion to epihalohydrin by-products is accelerated. Through experience, it has been found that the time for addition of at least about 90% by weight of the polyamine, while maintaining the reaction temperature within the specified range, should not exceed 150 minutes if 1,3-DCP levels are to be kept below the maximum levels desired. A more preferred addition time is 120 minutes or less for addition of at least about 90% of the amine, with 100 minutes or less time of addition being most preferred. Once about 90% of the polyamine is added then the time of addition of the remainder becomes less important. This condition is specifically related to the completion of the alkylation reaction between the polyamine and the epihalohydrin, at which point practically all of the epihalohydrin has been consumed in alkylating the polyamine.

Following complete addition of the polyamine, the temperature of the mixture is allowed to rise and /or the mixture is heated to effect crosslinking and azetidinium formation. The crosslinking rate is a function of concentration, temperature, agitation, and the addition conditions of the polyamine all of which can be readily determined by those skilled in the art. The crosslinking rate can be accelerated by the addition of small shots of the polyamine or other polyamines of the present invention or addition of various alkalies at or near the crosslinking temperature.

The resin is stabilized against further crosslinking to gelation by addition of acid, dilution by water, or a combination of both. Acidification to pH 5.0 or less is generally adequate.

The preferred polyamines are bishexamethylenetriamine, hexamethylenediamine, and their mixtures.

A wide range of aminochlorohydrin (ACH) and azetidinium (AZE) levels is possible with polyaminopolyamide-epi and polyamine-epi resins and is suitable for use in this invention. The ratio of ACH:AZE is at least about 2:98, preferably at least about 5:95 and most preferably at least about 10:90. The ACH:AZE ratio can be up to about 98:2, preferably up to about 95:5 and most preferably up to about 90:10. The starting water-soluble wet-strength resins of the present invention always contain tertiary ACH. Optionally, they may additionally contain secondary ACH and/or quaternary ammonium chlorohydrin also.

The following structures illustrate functionalities referred to in the present application. The ACH, epoxide, glycol and amine crosslinking functionalities are illustrated in terms of their tertiary species.

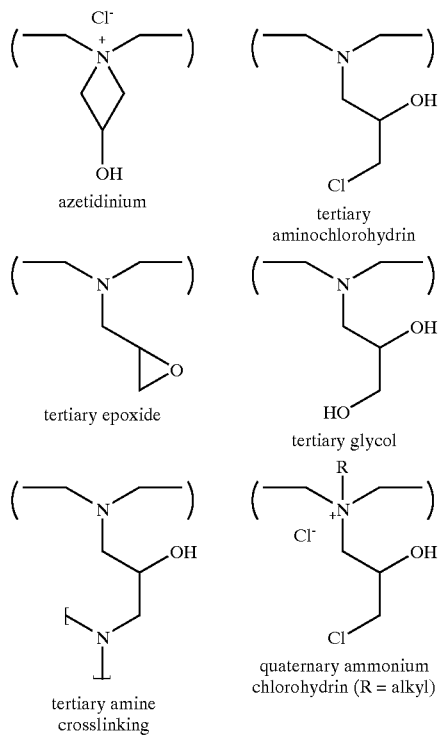

azetidinium tertiary aminochlorohydrin tertiary epoxide tertiary glycol tertiary amine crosslinking quaternary ammonium chlorohydrin (R = alkyl)

By the process of the present invention generally at least about 20% of the aminochlorohydrin present in the starting resin has been converted into epoxide. Preferably at least about 50% and most preferably at least about 90% of the aminochlorohydrin present in the starting resin has been converted to epoxide. By the present invention up to about 100% of the aminochlorohydrin present in the starting resin can be converted to epoxide.

It should be understood that the phrase "aminohalohydrin" as used in the present application can refer to secondary aminohalohydrin, tertiary aminohalohydrin and quaternary ammonium halohydrin unless otherwise specified.

It should also be understood that the phrase "epoxide" and "aminoepoxide" are used interchangeably in the present application and they refer to secondary am inoepoxide, tertiary am inoepoxide and quaternary aminionium epoxide unless otherwise specified.

Both organic and inorganic bases can be used herein in the present invention. A base is defined as any proton acceptor (see *Advanced Organic Chemistry, Third* Ed.; Jerry March; John Wiley & Sons: New York, 1985, p 218–236, incorporated herein by reference.) Typical bases include alkali metal hydroxides, carbonates and bicarbonates, alkaline earth metal hydroxides, trialkylamines, tetraalkylammonium hydroxides, ammonia, organic amines, alkali metal sulfides, alkaline earth sulfides, alkali metal alkoxides and alkaline earth alkoxides. Preferably, the base will be alkali metal hydroxides (lithium hydroxide, sodium hydroxide and potassium hydroxide) or alkali metal carbonates (sodium carbonate and potassium carbonate). Most preferably, the base is sodium hydroxide or potassium hydroxide.

The amount of base varies widely from resin to resin and is dependent on the resin type, the amount and type of polymeric aminochlorohydrin, the amount of the epi by-products (1,3-dichloropropanol, 2,3dichloropropanol and 3-chloropropanediol), the amount of stabilization acid in the resin and on the conditions used to activate the resin. The amount of base can be at least about 0.5 mmole, preferably at least about 1.5 mmole per dry gram of resin. The amount of base can be up to about 10 mmole, preferably up to about 8 mmole per dry gram of resin. The pH can be from 13.0–8.0, preferably 12.5–9.0, more preferably 12.0–10.0, most preferably 11.5–10.5.

The treatment temperature can be at least about 0° C., preferably at least about 20° C., preferably at least about 40° C., more preferably at least about 45° C. and most preferably at least about 50° C. The treatment temperature can be up to about 100° C., preferably up to about 80° C. and most preferably up to about 60° C. The treatment time can be at least about 1 minute, preferably at least about 3 min, and most preferably at least about 5 min. The treatment time can be up to about 24 hours, preferably up to about 4 hours and most preferably up to about 1 hour. The resin can be used about 1 minute to about 24 hours after base treatment, preferably about 1 minute to about 6 hours, most preferably about 1 minute to about 1 hour.

The resin solids for base treatment can be at least about 1%, preferably at least about 2%, preferably at least about 6%, more preferably at least about 8% and most preferably at least about 10% based upon the weight of the composition. In the context of the present invention the phrase "resin solids" means the active polyaminopolyamide-epi and/or polyalkylene polyamine-epi of the composition. The resin solids for base treatment can be up to about 40%, preferably up to about 25%, and most preferably up to about 15%. After base treatment, the resin can be diluted, typically, with water.

For most high molecular weight resins the preferred treatment conditions convert greater than 90% of the aminochlorohydrin functionality to epoxide functionality, with less than a 10% reduction in the amount of azetidinium functionality. For some resins, especially ones with low molecular weight, it may be preferred to allow some or all of the epoxide functionality be consumed by crosslinking reactions. Less preferred treatment conditions are such that greater than 5 mole % of the azetidinium and/or epoxide is converted to glycol functionality. This conversion reduces the total amount of reactive functionality which, generally, reduces the effectiveness of the treated resin. To have a highly effective resin, the mole % hydrolysis of total reactive functionality (azetidinium, epoxide and/or aminochlorohydrin) to glycol is from about 0% up to about 20%, preferably up to about 10%, more preferably up to about 5% and most preferably up to about 2%. To have a highly effective resin, the level of azetidinium ion in the treated resin will be substantially unchanged compared to the level before treatment. In the context of the present invention this means that the treated resin will have at least about 80 mole % of the azetidinium functionality in the untreated resin, preferably about 90 mole %, more preferably about 95 mole % and most preferably about 100 mole %.

The wet strength effectiveness of the treated resin of the present invention will not be substantially lowered by the base treatment. In the context of the present invention this means that the treated resin will have at least about 80% of the effectiveness of the untreated resin, preferably at least about 95% and most preferably about 100%. With resins containing more than about 5 mole % of aminohalohydrin, the present invention may provide a treated resin with effectiveness greater than the untreated resin. The effectiveness improvement can be from about 2–50%, preferably the improvement would be greater than about 5% and most preferably greater than about 10%.

The treatment conditions for each resin can be optimized to a given set of conditions, however, one skilled in the art will recognize that other conditions will also give good results. For example, if a shorter reaction time is desired, then a higher temperature could be used with good results.

The treatment conditions can reduce the AOX content to less than 50%, preferably less than 25%, preferably less than 10%, preferably less than 5%, more preferably less than 1%, most preferably, less than 0.5% of the AOX content in the untreated resin on an equal solids level basis. Although the focus of the present invention is to reduce AOX, it can also be used to reduce the levels of the epichlorohydrin (epi) by-products, 1,3-dichloropropanol (1,3-DCP), 2,3-dichloropropanol (2,3-DCP) and 3-chloropropanediol (3-CPD), in polyaminopolyamide-epi resins or polyalkylene polyamine-epi resins. Additionally, the present invention could be used to convert 1,3-DCP and 2,3-DCP to epi. This epi could be removed from the resin by further treatment, for example, by distillation or extraction.

Gas chromatography (GC) was used to determine epi and epi by-products in the treated and untreated resins using the following method. The resin sample was absorbed onto an extrelut column (available from EM Science, Extrelut QE, Part #901003-1) and extracted by passing ethyl acetate through the column. A portion of the ethyl acetate solution was chromatographed on a wide-bore, capillary column. If the flame ionization detector was used, the components were quantitated using n-octanol as the internal standard. If an electrolytic conductivity (ELCD) detector or if the XSD detector was used, an external standard method using peak matching quantitation was employed. The data system was either a millennium 2010 or HP ChemStation. The FID detector was purchased from Hewlett-Packard (HP). The ELCD detector, Model 5220, was purchased from OI Analytical. The XSD detector was purchased from OI Analytical, Model 5360 XSD. The GC instrument used was a HP Model 5890 series II. The column was DB wax 30 m×53 mm with 1.5 micron film thickness. For the FID and ELCD, the carrier gas was helium with a flow rate of 10 mL/min. The oven program was 35° C. for 7 minutes, followed by ramping at 8° C./min to 200° C. and holding at 200° C. for 5 minutes. The FID used hydrogen at 30 mL/min and air at 400 mL/min at 250° C. The ELCD used n-propanol as the electrolyte with an electrolyte flow rate setting of 50% with a reactor temperature or 900° C. The XSD reactor was operated in an oxidative mode at 1100° C. with a high purity air flow rate of 25 mL/min.

Kymene® ULX wet-strength resin is a polyaminopolyamide-epi resin available from Hercules Incorporated. The first sample used had a resin solids of 12.7% and a charge density of 3.36 meq/g at pH 1.8, 1.73 meq/g at pH 8 and 1.51 meq/g at pH 10. The second sample of Kymene® ULX wet strength resin used had a resin solids of 12.7% and a charge density of 3.28 meq/g at pH 1.8, 1.72 meq/g at pH 8 and 1.56 meq/g at pH 10.

E7045 wet-strength resin is a polyaminopolyamide-epi resin available from Hercules Incorporated. The sample used had a charge density of 3.34 meq/g at pH 1.8, 1.96 meq/g at pH 8 and 0.89 meq/g at pH 10 and a total solids of 13.0%.

Kymene® 557LX wet-strength resin is a polyaminopolyamide-epi resin available from Hercules Incorporated. It had a pH of 3.5, a total solids of 12.5%, and a Brookfield viscosity of 47 cps. It had a charge density of 1.39 meq/g at pH 10.

Kymene® 736 wet-strength resin is a polyalkylene polyamine-epi resin available from Hercules Incorporated. It had a pH of 3.3, a total solids of 37.8%, and a Brookfield viscosity of 250 cps. It had a charge density of 2.24 meq/g at pH 8.

Kymene® ULX2 wet-strength resin is a polyaminopolyamide-epi resin available from Hercules Incorporated.

The scope of this invention as claimed is not limited by the following examples, which are given merely by way of illustration. All parts and percentages are by weight unless otherwise indicated.

EXAMPLE 1, 1b and COMPARATIVE EXAMPLE 1

Base Treatment of Kymene® ULX Wet Strength Resin

To 48.15 g (wet basis) of Kymene® ULX resin, first sample, (12.7% resin solids) was added 6.25 g of deionized water. Magnetic stirring was started and the solution was heated to 55° C. with a water bath fitted with a Cole-Parmer Polystate® temperature controller. The pH was monitored with a Beckman 10 pH meter connected to an automatic temperature compensator and a Ross pH electrode, sure flow. The pH meter was calibrated daily with pH 7 and 10 buffer solutions. To the Kymene® ULX solution was injected 6.72 g (6.11 mL) of 10% (wt/wt) aqueous sodium hydroxide. (This gave a solution with 10% resin solids). The peak pH was 10.9 and the temperature dropped to 54° C. for about one minute. The pH was 10.1 after 5 minutes at which time the resin was cooled rapidly to room temperature and analyzed by $^{13}$C NMR and for AOX (see Table 1). A Mitsubishi Kasei Corporation instrument (model TOX-10Σ) was used for the AOX analysis, using the procedure described in the operating manual. The $^{13}$C NMR spectra are acquired using BRUKER AMX spectrometers equipped with a 10 mm broadband probe. A $^{13}$C NMR operating frequency of 100 MHz (AMX400) or 125 MHz (AMX500) is sufficient for data collection. In either case, the spectra are acquired with continuous $^1$H decoupling. Electronic integration of the appropriate signals provides molar concentrations of the following alkylation components; ACH EPX, GLY, and AZE. where:

ACH=polymeric aminochlorohydrins

EPX=polymeric epoxides

GLY=polymeric glycols

AZE=azetidinium ions

In order to calculate the concentrations of each of these species, the integral values must be placed on a one (1) carbon basis. For example, the spectral region between 20–42 ppm represents six (6) carbons of the diethylenetriamine-adipate backbone, hence the integral value is divided by six. This value is used as the polymer common denominator (PCD) for calculation of the alkylation species. The chemical shifts of these species are provided below (using an acetonitrile field reference of 1.3 ppm). The corresponding integral value of each alkylation product is used in the numerator for calculation, refer to examples below:

ACH signal at 68–69 ppm represents one carbon; integral of ACH÷PCD=mole fraction ACH GLY signal at 69–70 ppm represents one carbon; integral of GLY÷PCD=mole fraction GLY EPX carbon at 51–52ppm represents one carbon; integral of EPX÷PCD=mole fraction EPX AZE signal at 73–74 ppm represents two carbons, thus, a division factor of two is required; integral of AZE/2÷PCD=mole fraction AZE The following spectral parameters are standard experimental conditions for $^{13}$C NMR analysis of base treated Kymene resins on the Bruker AMX400.

| | |
|---|---|
| Temperature | 25° C. |
| Resonance Frequency | 100 MHz |
| # Data Points | 64 K |
| Dwell Time | 20 microseconds |
| Acquisition Time | 1.3 seconds |
| Sweep Width | 25000 Hz |
| Number of Scans | 1 K |
| Relaxation Delay | 3 seconds |
| Pulse Tip Angle | 70 degrees |
| Pulse Program | zgdc |
| Processed Spectral Size | 64 K |
| Apodization Function | exponential |
| Line Broadening | 3 Hz |

Paper handsheets were prepared on a Noble and Wood handsheet machine at pH 7.5 with 50:50 Rayonier bleached Kraft:James River bleached hardwood Kraft dry lap pulp refined to 500 mL Canadian standard freeness. Sheets were generated having 40 lb/3000 sq. ft. basis weight containing 0.5–1.0% of treated resin (based on the solids of untreated resin). Handsheets were wet pressed to 33% solids and dried on a drum drier at 230° C. for 55 seconds. Natural aging refers to paper conditioned according to TAPPI Method T402. All paper tested had greater than two weeks natural aging at 50%±2% relative humidity and at 23° C.±1° C.

Dry tensile strength was determined using TAPPI Method T494. Wet tensile strength was determined using TAPPI Method T456 with a two hour soak time.

As can be seen in Table 1, on an equal solids basis, the AOX content of Kymene® ULX resin was reduced from 2600 ppm (Comparative Example 1) to 35 ppm (Example 1) by the base treatment process in this invention. Example 1b employed the same conditions as Example 1 except the reaction time was 30 minutes. Base treated Kymene® ULX resin had 99–109% of the effectiveness of untreated Kymene® ULX resin for cured and natural aged handsheets at 0.5% and 1.0% addition levels. (See Tables 7 and 8). Employing the conditions of Example 1, the polymeric chlorohydrin functionality was cleanly converted to epoxide functionality without a significant reduction in the amount of azetidinium functionality, as determined by $^{13}$C NMR. This increase in total reactive functionality (epoxide and azetidinium) resulted in the high effectiveness of this base treated resin. Besides the low AOX and high effectiveness advantages, an additional advantage over the prior art is that no additional process step is needed, for example, regeneration of an ion exchange or carbon column.

EXAMPLES 2–9

Kymene® ULX was treated as in Example 1, except as shown in Table 1. The unreacted aminochlorohydrin (ACH) in Examples 2 and 4 shows that the conditions did not give optimal AOX reduction. It is understood by one skilled in the art that ACH is a contributor of AOX and that an AOX determination is not needed when ACH is present. It is also understood that epoxide functionality is more reactive than ACH functionality and that additional epoxide functionality in a resin will increase the wet strength effectiveness of the resin in many applications. Example 3 shows that longer reaction time did not significantly reduce the level of ACH but the epoxide was consumed. At an equal base amount as in Example 1, Examples 5 and 6 show that lower temperature leads to incomplete conversion of ACH even after a 4 hour reaction time. Examples 8 and 9 show that sodium carbonate and calcium hydroxide can be used to reduce AOX, but they are less effective, all other conditions being equal.

EXAMPLES 10–12 AND COMPARATIVE EXAMPLE 2

A different lot (second sample) of Kymene® ULX wet strength resin (Comparative Example 2) was treated as in Example 1, except as shown in Table 2. Example 10 shows that Example 1 could be reproduced with a different lot of Kymene® ULX resin. Relative to Example 10, Example 12 shows that a similar result can be obtained using a lower temperature (40° C.) and a longer reaction time (30 min). Compared to Example 11, Example 12 shows that a 30 min reaction time at 40° C. gave an AOX reduction closer to optimum. As can be seen in Table 9, on an equal solids basis, the level of epichlorohydrin by-products in the Kymene® ULX resin was also reduced by the base treatment process in this invention. For example, the 3 chloropropanediol (3-CPD) level was reduced from 57 ppm (Comparative Example 2) to 6 ppm (Example 10).

EXAMPLE 13 AND COMPARATIVE EXAMPLE 3

Base Treatment of E7045 Wet Strength Resin

The procedure and equipment used to treat E7045 resin (which is an polyaminopolyamide-epi resin available from Hercules Incorporated, Comparative Example 3) were the same as in Example 1, except for the following changes. To 47.15 g (wet basis) of E7045 resin was added 7.28 g of deionized water. Magnetic stirring was started and the solution was heated to 55° C. To the solution was injected 6.72 g (6.11 mL) of 10% (wt/wt) aqueous sodium hydroxide. The peak pH was 10.8. The pH was 10.1 after 5 minutes at which time the resin was cooled rapidly to room temperature and analyzed by $^{13}$C NMR and for AOX (see Table 3). Compared to Comparative Example 3, the base treatment process of Example 13 reduced the AOX level while maintaining the azetidinium (AZE) level. As can be seen in Table 9, on an equal solids basis, the level of epichlorohydrin by-products in E7045 resin was also reduced by the base treatment process in this invention. For example, the 3-chloropropanediol (3-CPD) level was reduced from 188 ppm (Comparative Example 3) to 10 ppm (Example 13).

EXAMPLES 14–20 AND COMPARATIVE EXAMPLE 4

Base Treatment of Kymene® 557LX Wet Strength Resin (Example 17)

The procedure and equipment used to treat Kymene® 557LX polyaminopolyamide-epi resin (Comparative Example 4) were the same as in Example 1, except for the following changes. To 48.92 g (wet basis) of Kymene® 557LX resin was added 6.36 g of deionized water. Magnetic stirring was started and the solution was heated 55° C. To this solution was injected 5.87 g (5.87 mL) of 10% (wt/wt) aqueous sodium hydroxide. The peak pH was 10.9. The pH was 10.2 after 5 minutes at which time the resin was cooled rapidly to room temperature and analyzed by $^{13}$C NMR and for AOX (see Table 4). The procedure for Examples 14, 15, 16, 18, 19 and 20 was similar to Example 17 except as indicated in Table 4. In Example 16, the base treatment process of Kymene® 557LX resin resulted in a resin with slightly decreased effectiveness, 89–101% of Kymene® 557LX resin, with 188 ppm (corrected to 12.5% solids) of AOX (see Tables 7 and 8). The AOX and NMR results suggested that this resin was overtreated, so using less sodium hydroxide would have improved effectiveness. Example 17 showed that less base (2.4 mmole NaOH/g dry resin versus 2.8) could be used with a comparable AOX reduction and with only a 4% decrease in AZE (see Table 4). Example 18 shows that further reduction in the amount of base (to 2.0 mmole of NaOH/g dry resin) leads to incomplete conversion of ACH to epoxide with the resulting increase in AOX (see Table 4). From these results, under the same reaction conditions, the optimum amount of base is greater than about 2.0 and less than about 2.8 mmole of NaOH/g dry resin. Examples 19 and 20 show that a lower temperature and a longer reaction time is less effective in reducing AOX compared to Example 18. As can be seen in Table 9, on an equal solids basis, the total level of epichlorohydrin and epichlorohydrin by-products in the Kymene® 557LX wet-strength resin was also reduced by the base treatment process in this invention. For example, the 3-chloropropanediol (3-CPD) level was reduced from 190 ppm (Comparative Example 4) to 163 ppm (Example 18) and the 1,3-dichloropropanol (1,3-DCP) level was reduced from 800 ppm to 14 ppm.

EXAMPLES 21–22 AND COMPARATIVE EXAMPLE 5

Synthesis of Poly(adipic Acid-co-diethylenetriamine)

A resin kettle was fitted with a heavy duty mechanical stirrer, a Dean-Stark trap/water condenser, a temperature controller, and a nitrogen sparge. To the flask was charged 297.13 g (2.88 mole) of diethylenetriamine (Aldrich, 99%) and then 438.42 g (3.00 mole) of adipic acid (Aldrich, 99%) was slowly added so as to maintain the exotherm below 120° C. The yellow pasty mixture was slowly heated to 170–173° C. over 3 hours. Water started to collect at about 150° C. After an additional 2 hours at 170–173° C., the viscous polymer was allowed to cool to about 145° C. and 465 g of deionized water was carefully added. The solution was allowed to cool to ambient temperature and was bottled. [Total solids 60.37%, Intrinsic viscosity (IV)=0.160 in 1 M ammonium chloride at 25° C.]

Synthesis of Polyaminopolyamide-epi resin containing about 13 mole % of azetidinium (Comparative Example 5)

A 500-mL flask was fitted with a condenser, a pH meter, a temperature controller and heating mantle, an addition funnel and a mechanical stirrer. To the flask was added 105.99 g (63.98 g solids, 0.30 mole, IV=0.160) of 60.37% aqueous poly(adipic acid-co-diethylenetriamine) synthesized above and 53.97 g of deionized water (to give 40% solids). The solution was heated to 30° C. with a temperature controlled water bath and then 24.98 g (0.27 mole) of epichlorohydrin (Aldrich, 99%) was added over 3 minutes. The temperature was raised to 35° C. The pH dropped from 9.4 to 7.6 over the course of the reaction. After 5 hours at 35° C., 526.8 g of deionized water was added and the pH was adjusted to 2.9 with 11.42 9 of concentrated sulfuric acid. Analyses: total solids, 13.56%; AOX, 0.96%.

Base Treatment of Polyaminopolyamide-epi Resin of Comparative Example 5 (Example 21)

The procedure and equipment used to activate Comparative Example 5 were the same as in Example 1 except as shown in Table 5 and as follows. To 45.10 g (wet basis) of Comparative Example 5 was added 3.82 g of deionized water. Magnetic stirring was started and the solution was heated to 55° C. To this solution was injected 12.22 g of 10% (wt/wt) aqueous sodium hydroxide. The peak pH was 11.6. The pH was 10.9 after 5 minutes at which time the resin was cooled rapidly to room temperature and analyzed by $^{13}$C NMR and for AOX (see Table 5). Example 22 was prepared as in Example 21 except as noted in Table 5. Example 21 shows that the ACH functionality was cleanly converted to epoxide functionality. The level of AOX was greatly reduced from 9600 ppm in Comparative Example 5 (i.e., untreated resin) to 244 ppm in Example 21. This resin dramatically increased in effectiveness upon base treatment to 121–134% of the untreated resin in a handsheet evaluation (see Tables 7 and 8). Example 22 shows conditions that result in incomplete conversion of ACH functionality and in less than optimum reduction in AOX. As can be seen in Table 9, on an equal solids basis, the total level of epichlorohydrin and epichlorohydrin by-products in this resin was also reduced by the base treatment process in this invention. For example, the 3-chloropropanediol (3-CPD) level was reduced from 528 ppm (Comparative Example 5) to 132 ppm (Example 22) and the 1,3-dichloropropanol (1,3-DCP) level was reduced from 896 ppm to 23 ppm.

EXAMPLES 23–28 and COMPARATIVE EXAMPLE 6

Base Treatment of Kymene® 736 Wet Strength Resin (Example 24)

The procedure and equipment used to treat Kymene® 736 polyamine-epi wet strength resin (Comparative Example 6)

were the same as in Example 1 except as follows. To 15.8 g (wet basis) of Kymene® 736 resin was added 35.75 9 of deionized water. Magnetic stirring was started and the solution was heated to 55° C. To this solution was injected 9.60 g (8.73 mL) of 10% (wt/wt) aqueous sodium hydroxide. The peak pH was 10.3. The pH was 9.1 after 5 minutes at which time the resin was cooled rapidly to room temperature and analyzed by $^{13}$C NMR and for AOX (see Table 6). Examples 23, 25, 26, 27 and 28 were the same as Example 24 except as noted in Table 6. Example 24 shows that, relative to the Comparative Example 6, the level of AOX (the level of ACH being an indicator of the level of AOX) was reduced with only a slight reduction in the level of azetidinium. Example 23 shows that a lesser amount of base (all other conditions being equal) resulted in incomplete conversion of ACH, which, if measured, would give a higher AOX level. Example 25 shows the level of AOX reduction achievable with this process. Example 25 and 26 shows that increasing the level of base (all other conditions being equal) resulted in a reduction in the amount of azetidinium relative to Example 24. This reduction would be expected to reduce the effectiveness of the resin. Example 27 shows that increasing the pH of Kymene® 736 resin to 8.0 results in only a slight decrease in the level of ACH. Lower temperature reaction (Example 28) gives comparable $^{13}$C NMR results as in Example 25, but the level of AOX is higher. As can be seen in Table 91 on an equal solids basis, the total level of epichlorohydrin and epichlorohydrin by-products in the Kymene® 736 wet-strength resin was also reduced by the base treatment process in this invention. For example, the 3-chloropropanediol (3-CPD) level was reduced from 175 ppm (Comparative Example 6) to 53 ppm (Example 25) and the 1,3-dichloropropanol (1,3-DCP) level was reduced from 1000 ppm to 8 ppm.

EXAMPLE 29 and COMPARATIVE EXAMPLE 7

Base Treatment of Kymene® ULX2 Wet Strength Resin

To 62.50 g (wet basis) of Kymene® ULX2 resin (12.8% resin solids) was added 8.70 g of deionized water. Magnetic stirring was started and the solution was heated to 55° C. with a water bath fitted with a Cole-Parmer Polystate temperature controller. The pH was monitored with a Beckman 10 pH meter connected to an automatic temperature compensator and a Ross pH electrode, sure flow. The pH meter was calibrated daily with pH 7 and 10 buffer solutions. To the Kymene® ULX2 solution was injected 8.80 g (8.00 mL) of 10% (wt/wt) aqueous sodium hydroxide. (This gave a solution with 10% resin solids). The peak pH was 10.4. The pH was 10.1 after 5 minutes at which time the resin was cooled rapidly to room temperature and analyzed by gas chromatography (GC) (see Table 9).

As can be seen in Table 9, on an equal solids basis, the level of epichlorohydrin by-products in the Kymene® ULX2 resin was reduced by the base treatment process in this invention. For example, the 3-chloropropanediol (3-CPD) level was reduced from 2.5 ppm (Comparative Example 7) to 0.5 ppm (Example 29).

TABLE 1[4]

Analysis of Base Treated Kymene ® ULX Wet-Strength Resin by $^{13}$C NMR and AOX

| Example | Treatment Conditions | mmole NaOH/g resin (dry) | AOX (ppm) (equal solids basis)[1] | % AZE[2] | % ACH[3] | % Glycol | Percent Epoxide | % Tertiary Amine |
|---|---|---|---|---|---|---|---|---|
| Comp Ex. 1 | Untreated | None | 2600 | 37.2 | 7.0 | 2.8 | 0.0 | 17.0 |
| Ex. 1 | 55° C. for 5 min | 2.8, peak pH: 10.9 | 35 | 36.2 | 0.0 | 4.8 | 8.4 | 20.9 |
| Ex. 2 | 25° C. for 5 min | 2.3, peak pH: 9.9 | — | 39.0 | 5.5 | 3.9 | 4.2 | 17.7 |
| Ex. 3 | 25° C. for 24 h | 2.3, 4 h pH: 9.6 | — | 36.2 | 5.2 | 4.8 | 0.0 | 21.4 |
| Ex. 4 | 55° C. for 5 min | 2.3, peak pH: 10.4 | 743 | 36.4 | 3.8 | 3.9 | 4.4 | 21.3 |
| Ex. 5 | 25° C. for 5 min | 2.8, peak pH: 11.7 | — | 36.9 | 0.9 | 4.5 | 7.7 | 23.4 |
| Ex. 6 | 25° C. for 4 h | 2.8 4 h pH: 10.6 | — | 34.5 | 0.7 | 3.5 | 7.1 | 23.7 |
| Ex. 7 | 55° C. for 5 min | 3.3, peak pH: 11.1 | — | 35.8 | 0.0 | 6.3 | 6.5 | 24.1 |
| Ex. 8 | 55° C. for 5 min | 3.3 (Na$_2$CO$_3$) peak pH: 9.5 | 1226 | — | — | — | — | — |
| Ex. 9 | 55° C. for 5 min | 0.79 (Ca(OH)$_2$) | 2477 | — | — | — | — | — |

[1]AOX = adsorbable organic halogen,
[2]AZE = azetidinium,
[3]ACH = aminochlorohydrin
[4]all AZE, ACH, Glycol, Epoxide and Tertiary Amine percentages are mole percent based on the resin in this and all other Tables.

TABLE 2

Analysis of Base Treated Kymene ® ULX Wet-Strength Resin by $^{13}$C NMR and AOX

| Example | Treatment Conditions | mmole NaOH/g resin (dry) | AOX (ppm) (equal solids basis) | % AZE | % ACH | % Glycol | Percent Epoxide | % Tertiary Amine |
|---|---|---|---|---|---|---|---|---|
| Comp. Ex. 2 | Untreated | none | 2500 | 43.1 | 6.3 | 2.5 | 0.0 | 13.9 |
| Ex. 10 | 55° C. for 5 min | 2.8, peak pH: 10.7 | 11 | 41.9 | 0.0 | 2.8 | 5.8 | 16.7 |
| Ex. 11 | 40° C. for 5 min | 2.8, peak pH: 10.7 | 83 | — | — | — | — | — |
| Ex. 12 | 40° C. for 30 min | 2.8, peak pH: 10.7 | 12 | 40.4 | 0.0 | 3.2 | 5.5 | 15.9 |

TABLE 3

Analysis of Base Treated E7045 Wet-Strength Resin by $^{13}$C NMR and AOX.

| Example | Treatment Conditions | mmole NaOH/g resin (dry) | AOX (ppm) (equal solids basis) | % AZE | % ACH | % Glycol | Percent Epoxide | % Tertiary Amine |
|---|---|---|---|---|---|---|---|---|
| Comp. Ex. 3 | Untreated | none | 880 | 35.4 | 0.8 | 1.3 | 0.0 | 8.8 |
| Ex. 13 | 55° C. for 5 min | 2.8, peak pH: 10.8 | 78 | 35.7 | 0.0 | 2.5 | 0.0 | 10.1 |

TABLE 4

Analysis of Base Treated Kymene ® 557LX Wet-Strength Resin by $^{13}$C NMR and AOX

| Example | Treatment Conditions | mmole NaOH/g resin (dry) | AOX (ppm) (equal solids basis) | % AZE | % ACH | % Glycol | Percent Epoxide | % Tertiary Amine |
|---|---|---|---|---|---|---|---|---|
| Comp. Ex. 4 | Untreated | None | 3200 | 51.6 | 8.8 | 1.9 | 0.0 | 12.9 |
| Ex. 14 | 25° C. for 10 min | 1.6, peak pH 10.7 | 2500 | 49.5 | 7.8 | 1.0 | 1.6 | 12.7 |
| Ex. 15 | 25° C. for 4 h | 1.6, 4 h pH 8.8 | 1750 | 49.2 | 7.5 | 0.9 | 1.5 | 11.8 |
| Ex. 16 | 55° C. for 5 min | 2.8, peak pH: 11.4 | 188 | 44.8 | 0.0 | 2.0 | 7.3 | 19.0 |
| Ex. 17 | 55° C. for 5 min | 2.4, peak pH: 10.9 | 200 | 47.5 | 0.0 | 1.7 | 7.9 | 19.5 |
| Ex. 18 | 55° C. for 5 min | 2.0, peak pH: 10.4 | 663 | 51.0 | 1.5 | 0.7 | 5.0 | 21.3 |
| Ex. 19 | 25° C. for 5 min | 2.0, peak pH: 11.3 | 1663 | 51.5 | 3.0 | 1.0 | 4.1 | 21.1 |
| Ex. 20 | 25° C. for 4 h | 2.0, 4 h pH: 9.4 | 763 | — | — | — | — | — |

TABLE 5

Analysis of Base Treated Comparative Example 5 by $^{13}$C NMR and AOX

| Example | Treatment Conditions | Mmole NaOH/g resin (dry) | AOX (ppm) (equal solids basis) | % AZE | % ACH | % Glycol | Percent Epoxide | % Tertiary Amine |
|---|---|---|---|---|---|---|---|---|
| Comp. Ex. 5 | Untreated | None | 9600 | 13.1 | 54.8 | ND | 0.0 | 52.8 |
| Example 21 | 55° C. for 5 min | 5.0 peak pH 11.6 | 244 | 11.8 | 0.0 | ND | 53.4 | 59.2 |
| Example 22 | 55° C. for 5 min | 4.3, peak pH 11.2 | 759 | 12.8 | 5.1 | 0.7 | 39.1 | 53.7 |

TABLE 6

Analysis of Base Treated Kymene ® 736 Wet-Strength Resin by $^{13}$C NMR and AOX

| Example | Treatment Conditions | mmole NaOH/g resin (dry) | AOX (ppm) (10% solids basis) | % AZE | % ACH | % Glycol | Percent Epoxide |
|---|---|---|---|---|---|---|---|
| Comp. Ex. 6 | Untreated | none | 4820 | 42 | 30 | <2 | <2 |
| Ex. 23 | 55° C. for 5 min | 2.8, peak pH: 9.8 | — | 41 | 8–10 | <5 | 14 |
| Ex. 24 | 55° C. for 5 min | 3.9, peak pH: 10.3 | — | 41 | <2 | <5 | 14 |
| Ex. 25 | 55° C. for 5 min | 4.3, peak pH: 10.8 | 165 | 38 | <2 | 5–10 | 13 |
| Ex. 26 | 55° C. for 5 min | 5.1, peak pH: 11.1 | — | 32 | <2 | 10–20 | 7 |
| Ex. 27 | 25° C. for 5 min | pH adjusted to 8.0 | — | 42 | 28 | <2 | 1 |
| Ex. 28 | 25° C. for 5 min | 4.3, peak pH: 11.8 | 770 | 37 | <2 | 5–10 | 13 |

TABLE 7

Handsheet Evaluation of Base Treated Resin (Paper was Naturally Aged)

| Example | % Resin Added | Basis Wt. (lbs/3000 sq. ft.) | Caliper (mils) | Dry[1] Tensile (lbs/in) | Wet[1] Tensile (lbs/in) | % Wet/Dry Str. | Wet Strength %[2] |
|---|---|---|---|---|---|---|---|
| Blank | 0.0 | 40.7 | 4.88 | 17.49 | 0.50 | 3 | — |
| Comp. Ex. 1 | 0.5 | 40.0 | 5.00 | 21.00 | 3.95 | 19 | — |
| Comp. Ex. 1 | 1.0 | 40.2 | 5.07 | 21.69 | 4.90 | 23 | — |
| Ex. 1 | 0.5 | 40.8 | 4.88 | 20.59 | 3.89 | 19 | 99 |
| Ex. 1 | 1.0 | 38.9 | 4.95 | 21.29 | 5.05 | 24 | 103 |
| Ex. 1b | 0.5 | 39.8 | 4.93 | 21.41 | 4.28 | 20 | 108 |
| Ex. 1b | 1.0 | 40.0 | 5.07 | 23.40 | 5.36 | 23 | 109 |
| Ex. 7 | 0.5 | 40.2 | 5.00 | 20.30 | 3.81 | 19 | 96 |
| Ex. 7 | 1.0 | 39.9 | 4.97 | 21.55 | 4.85 | 23 | 99 |
| Ex. 8 | 0.5 | 40.9 | 5.08 | 19.56 | 3.79 | 19 | 96 |
| Ex. 8 | 1.0 | 41.0 | 5.15 | 22.34 | 5.01 | 22 | 102 |
| Comp. Ex. 4 | 0.5 | 39.9 | 4.94 | 20.05 | 4.32 | 22 | — |
| Comp. Ex. 4 | 1.0 | 40.3 | 5.05 | 22.03 | 5.16 | 23 | — |
| Ex. 16 | 0.5 | 40.3 | 4.91 | 20.15 | 4.31 | 21 | 100 |
| Ex. 16 | 1.0 | 40.3 | 4.89 | 22.43 | 5.20 | 23 | 101 |
| Comp. Ex. 5 | 0.5 | 40.4 | 4.90 | 19.60 | 3.18 | 16 | — |
| Comp. Ex. 5 | 1.0 | 40.8 | 4.93 | 19.80 | 4.04 | 20 | — |
| Ex. 21 | 0.5 | 38.8 | 4.77 | 20.21 | 3.99 | 20 | 126 |
| Ex. 21 | 1.0 | 40.2 | 4.92 | 23.08 | 5.40 | 23 | 134 |

Footnotes for Table 7 and Table 8:
[1]Wet and dry tensiles were linearly normalized to a basis weight of 40 lbs/3000 sq. ft.
[2]Wet strength of paper made with treated resin expressed as a percentage of the wet strength of paper made with untreated resin at the same % of resin added.

TABLE 8

Handsheet Evaluation of Base Treated Resin (Paper was Cured at 80° C. for 30 min)

| Example | % Added | Basis Wt. (lbs/3000 sq. ft.) | Caliper (mils) | Dry[1] Tensile (lbs/in) | Wet[1] Tensile (lbs/in) | % Wet/Dry | Wet Strength Percent[2] |
|---|---|---|---|---|---|---|---|
| Blank | 0.0 | 40.6 | 4.83 | 16.06 | 0.52 | 3 | — |
| Comp. Ex. 1 | 0.5 | 40.2 | 4.96 | 20.80 | 4.17 | 20 | — |
| Comp. Ex. 1 | 1.0 | 39.4 | 5.02 | 21.12 | 5.34 | 25 | — |
| Ex. 1 | 0.5 | 40.1 | 5.03 | 20.55 | 4.50 | 22 | 108 |
| Ex. 1 | 1.0 | 39.1 | 4.93 | 21.28 | 5.49 | 26 | 103 |
| Ex. 1b | 0.5 | 40.2 | 5.06 | 21.89 | 4.52 | 21 | 108 |

TABLE 8-continued

Handsheet Evaluation of Base Treated Resin
(Paper was Cured at 80° C. for 30 min)

| Example | % Added | Basis Wt. (lbs/3000 sq. ft.) | Caliper (mils) | Dry[1] Tensile (lbs/in) | Wet[1] Tensile (lbs/in) | % Wet/ Dry | Wet Strength Percent[2] |
|---|---|---|---|---|---|---|---|
| Ex. 1b | 1.0 | 40.2 | 5.04 | 23.88 | 5.66 | 24 | 106 |
| Ex. 7 | 0.5 | 40.6 | 4.97 | 20.89 | 4.23 | 20 | 101 |
| Ex. 7 | 1.0 | 39.8 | 4.98 | 22.21 | 5.17 | 23 | 97 |
| Ex. 8 | 0.5 | 40.4 | 4.93 | 21.19 | 4.36 | 21 | 104 |
| Ex. 8 | 1.0 | 40.8 | 5.00 | 21.96 | 5.23 | 24 | 98 |
| Comp. Ex. 4 | 0.5 | 39.6 | 4.93 | 21.92 | 5.05 | 23 | — |
| Comp. Ex. 4 | 1.0 | 40.2 | 4.93 | 21.59 | 5.68 | 26 | — |
| Ex. 16 | 0.5 | 40.7 | 4.92 | 21.13 | 4.51 | 21 | 89 |
| Ex. 16 | 1.0 | 40.8 | 4.95 | 20.78 | 5.52 | 27 | 97 |
| Comp. Ex. 5 | 0.5 | 41.0 | 4.87 | 20.00 | 3.47 | 17 | — |
| Comp. Ex. 5 | 1.0 | 40.8 | 4.99 | 20.59 | 4.41 | 21 | — |
| Ex. 21 | 0.5 | 39.4 | 4.82 | 20.51 | 4.19 | 20 | 121 |
| Ex. 21 | 1.0 | 40.2 | 4.92 | 22.09 | 5.59 | 25 | 127 |

TABLE 9

GC Analysis of Base Treated Wet-Strength Resins for Epichlorohydrin By-products

| Example | Treatment Conditions | Mmole NaOH/g resin (dry basis) | epi (ppm)[1] | 1,3-DCP (ppm)[2] | 2,3-DCP (ppm)[3] | 3-CPD (ppm)[4] |
|---|---|---|---|---|---|---|
| Comp. Ex. 2 | Untreated | None | <1 | <1 | 1 | 57 |
| Ex. 10 | 55° C. for 5 min | 2.8 | <1 | <1 | <1 | 6 |
| Ex. 11 | 40° C. for 5 min | 2.8 | <1 | <1 | 1 | 51 |
| Comp. Ex. 7 | Untreated | None | <0.1 | <0.1 | 0.7 | 2.5 |
| Ex. 29 | 55° C. for 5 min | 2.8 | <0.1 | <0.1 | 0.5 | 0.5 |
| Comp. Ex. 3 | Untreated | None | <1 | 178 | 8 | 188 |
| Ex. 13 | 55° C. for 5 min | 2.8 | 108 | <1 | <1 | 10 |
| Comp. Ex. 4 | Untreated | None | <10 | 800 | <10 | 190 |
| Ex. 19 | 25° C. for 5 min | 2.0 | 440 | 45 | <1 | 324 |
| Ex. 18 | 55° C. for 5 min | 2.0 | 439 | 14 | <1 | 163 |
| Comp. Ex. 5 | untreated | None | <1 | 896 | <1 | 528 |
| Ex. 22 | 55° C. for 5 min | 4.3 | 479 | 23 | 1 | 132 |
| Comp. Ex. 6 | untreated | None | <10 | 1000 | <10 | 175 |
| Ex. 28 | 25° C. for 5 min | 4.3 | 450 | 53 | 4 | 144 |
| Ex. 25 | 55° C. for 5 min | 4.3 | 193 | 8 | 4 | 53 |

[1]epi = epichlorohydrin, ppm = parts per million in the resin (wet basis). The data for the base treated resins were corrected to a solids equal to the corresponding untreated resin.
[2]1,3-DCP = 1,3-dichloropropanol, ppm = parts per million in the resin (wet basis). The data for the base treated resins were corrected to a solids equal to the corresponding untreated resin.
[3]2,3-DCP = 2,3-dichloropropanol, ppm = parts per million in the resin (wet basis). The data for the base treated resins were corrected to a solids equal to the corresponding untreated resin.
[4]3-CPD = 3-chloropropanediol, ppm = parts per million in the resin (wet basis). The data for the base treated resins were corrected to a solids equal to the corresponding untreated resin.

What is claimed is:

1. A process for reducing AOX content of a starting water-soluble wet-strength resin comprising azetidinium ions and tertiary aminohalohydrin, wherein the starting water-soluble wet-strength resin is selected from the group consisting of polyaminopolyamide-epichlorohydrin resins, polyalkylene polyamine-epichlorohydrin resins, and mixtures thereof, comprising:
treating said resin in aqueous solution with base to form treated resin, wherein at least about 20% of the tertiary aminohalohydrin present in the starting resin is converted into epoxide, the level of azetidinium ion is substantially unchanged, and the effectiveness of the treated resin in imparting wet strength is at least about as great as that of said starting wet-strength resin.

2. The process of claim 1 wherein the base comprises alkali metal hydroxides, alkali metal carbonates, alkali metal bicarbonates, alkaline earth metal hydroxides, trialkylamines or tetraalkylammonium hydroxides.

3. The process of claim 1 wherein the starting water-soluble wet-strength resin additionally comprises at least one of secondary aminohalohydrin and quaternary ammonium halohydrin.

4. The process of claim 1 wherein up to about 100% of the aminohalohydrin present in the starting resin is converted into epoxide.

5. The process of claim 1 wherein the concentration of starting water-soluble wet-strength resin is at least about 1% by weight.

6. The process of claim 1 wherein the concentration of starting water-soluble wet-strength resin is up to about 40% by weight.

7. The process of claim 1 wherein the amount of base is at least about 0.5 millimoles per gram of starting resin on a dry basis.

8. The process of claim 1 wherein the amount of base is up to about 10 millimoles per gram of starting resin on a dry basis.

9. The process of claim 1 wherein the temperature is up to about 100° C.

10. The process of claim 1 wherein the starting water-soluble wet-strength resin is treated with base for at least about 1 minute.

11. The process of claim 1 wherein the starting water-soluble wet-strength resin is treated with base for up to about 24 hours.

12. The process of claim 1 wherein:
the base comprises alkali metal hydroxides, alkali metal carbonates, alkali metal bicarbonates, alkaline earth metal hydroxides, trialkylamines or tetraalkylammonium hydroxides,
up to about 100% of the tertiary amino halohydrin present in the starting resin is converted into epoxide,
the concentration of starting water-soluble resin is from about 1% to about 40% by weight,
the amount of base is from about 0.5 to about 10 millimoles per gram of starting resin on a dry basis,
the temperature is up to about 100° C., and
the starting water-soluble wet-strength resin is treated with base for a period of time from about 1 minute to about 24 hours.

13. The process of claim 12 wherein:
(a) the polyaminopolyamide-epichlorohydrin resin comprises the reaction product of epichlorohydrin and polyamide derived from polyalkylene polyamine and dibasic carboxylic acid or ester containing from about 3 to 10 carbon atoms,
(b) the polyamine-epichlorohydrin resin comprises the reaction product of epichlorohydrin and polyalkylene polyamine; and
wherein the polyalkylene polyamine comprises at least one of polyethylene polyamines, polypropylene polyamines, polybutylene polyamines, polypentylene polyamines, and polyhexylene polyamines.

14. The process of claim 13 wherein:
the base comprises sodium carbonate, potassium carbonate, sodium hydroxide or potassium hydroxide,
the tertiary aminohalohydrin is tertiary aminochlorohydrin,
from about 50 to about 100% of the tertiary aminohalohydrin present in the starting resin is converted into epoxide,
the concentration of the starting water-soluble wet-strength resin is from about 2% to about 25% by weight, the amount of base is from about 1.5 to about 8 millimoles per gram of starting resin on a dry basis, the temperature is from about 20° C. to about 80° C., and
the starting water-soluble wet-strength resin is treated with base for a period of from about 3 minutes to about 4 hours.

15. The process of claim 14 wherein:
(a) the polyaminopolyamide-epichlorohydrin resin comprises the reaction product of epichlorohydnin and polyamide derived from polyalkylene polyamine comprising at least one of diethylenetriamine, triethylenetetramine, and tetraethylenepentamine and dibasic carboxylic acid or ester comprising at least one of glutaric acid, adipic acid, and their esters; and
(b) the polyamine-epichlorohydrin resin comprises the reaction product of epichlorohydrin and polyalkylene polyamine comprising at least one of hexamethylenediamine, and bishexamethylenetriamine.

16. The process of claim 15 wherein the starting water-soluble wet-strength resin is treated with base for up to about 1 hour.

17. The process of claim 15 wherein:
the base comprises at least one of sodium hydroxide and potassium hydroxide,
from about 90 to about 100% of the tertiary aminohalohydrin present in the starting resin is converted into epoxide,
the concentration of starting water-soluble wet-strength resin is from about 5% to about 15% by weight, the temperature is from about 40° C. to about 60° C. and the starting water-soluble wet-strength resin is treated with base for a period of from about 5 minutes to about 1 hour.

18. The process of claim 14 wherein the base comprises at least one of sodium hydroxide and potassium hydroxide.

19. The process of claim 14 wherein at least about 90% of the tertiary aminochlorohydrin present in the starting resin is converted into epoxide.

20. The process of claim 14 wherein the concentration of the starting water-soluble wet-strength resin is at least about 5% by weight.

21. The process of claim 14 wherein the concentration of the starting water-soluble wet-strength resin is up to about 15% by weight.

22. The process of claim 14 wherein the temperature is at least about 40° C.

23. The process of claim 14 wherein the temperature is up to about 60° C.

24. The process of claim 14 wherein the starting water-soluble wet-strength resin is treated with base for at least about 5 minutes.

25. The process of claim 12 wherein the base comprises sodium carbonate, potassium carbonate, sodium hydroxide or potassium hydroxide.

26. The process of claim 12 wherein the tertiary aminohalohydrin is tertiary aminochlorohydrin.

27. The process of claim 12 wherein at least about 50% of the tertiary aminohalohydrin present in the starting resin is converted into epoxide.

28. The process of claim 12 wherein the concentration of starting water-soluble wet-strength resin is at least about 2% by weight.

29. The process of claim 12 wherein the concentration of starting water-soluble wet-strength resin is up to about 25% by weight.

30. The process of claim 12 wherein the amount of base is at least about 1.5 millimoles per gram of starting resin on a dry basis.

31. The process of claim 12 wherein the amount of base is up to about 8 millimoles per gram of starting resin on a dry basis.

32. The process of claim 12 wherein the temperature is at least about 20° C.

33. The process of claim 12 wherein the temperature is up to about 80° C.

34. The process of claim 12 wherein the starting water-soluble wet-strength resin is treated with base for at least about 3 minutes.

35. The process of claim 12 wherein the starting water-soluble wet-strength resin is treated with base for up to about 4 hours.

36. The process according to claim 1, wherein at least about 50% of the tertiary aminohalohydrin present in the starting resin is converted into epoxide.

37. The process according to claim 36, wherein at least about 90% of the tertiary aminohalohydrin present in the starting resin is converted into epoxide.

38. The process according to claim 37, wherein about 100% of the tertiary aminohalohydrin present in the starting resin is converted into epoxide.

39. The process according to claim 38, comprising a treatment temperature of about 40° C. to about 60° C.

40. The process according to claim 37, comprising a treatment temperature of about 40° C. to about 60° C.

41. The process according to claim 36, comprising a treatment temperature of about 40° C. to about 60° C.

42. A process comprising treating a starting water-soluble wet-strength resin comprising azetidinium ions and tertiary aminohalohydrin in aqueous solution with base to form treated resin, the starting water-soluble wet-strength resin is selected from the group consisting of polyaminopolyamide-epichlorohydrin resins, polyalkylene polyamine-epichlorohydrin resins, and mixtures thereof, and at least about 20% of the tertiary aminohalohydrin present in the starting resin is converted into epoxide, the treated resin has at least about 80 mole % of the azetidinium functionality of the untreated resin, and the effectiveness of the treated resin has at least 80% of the wet strength effectiveness of the starting resin.

43. The process of claim 42 wherein:
   up to about 100% of the tertiary aminohalohydrin present in the starting resin is converted into epoxide,
   the concentration of starting water-soluble resin is from about 1% to about 40% by weight,
   the amount of base is from about 0.5 to about 10 millimoles per gram of starting resin on a dry basis, the temperature is up to about 100° C., and
   the starting water-soluble wet-strength resin is treated with base for a period of time of from about 1 minute to about 24 hours.

44. The process according to claim 42 wherein the base comprises alkali metal hydroxides, alkali metal carbonates, alkali metal bicarbonates, alkaline earth metal hydroxides, trialkylamines, tetraalkylammonium hydroxides, ammonia, organic amines, alkali metal sulfides, alkaline earth sulfides, alkali metal alkoxides or alkaline earth alkoxides.

45. The process according to claim 42, wherein the treated resin has at least about 90 mole % of azetidinium functionality of the untreated resin.

46. The process according to claim 45, wherein the treated resin has at least about 95 mole % of azetidinium functionality of the untreated resin.

47. The process according to claim 46, wherein the treated resin has about 100 mole % of azetidinium functionality of the untreated resin.

48. The process according to claim 45, wherein at least about 50% of the tertiary aminohalohydrin present in the starting resin is converted into epoxide.

49. The process according to claim 48, wherein at least about 90% of the tertiary aminohalohydrin present in the starting resin is converted into epoxide.

50. The process according to claim 49, wherein about 100% of the tertiary aminohalohydrin present in the starting resin is converted into epoxide.

51. The process according to claim 42, wherein the treated resin has at least about 90 mole % of azetidinium functionality of the untreated resin.

52. The process according to claim 42, wherein the wet strength effectiveness of the resin is at least about 95% of the starting resin.

* * * * *